April 14, 1942.  H. D. BRANDEBERRY  2,279,747
WEEDING TOOL
Filed Sept. 16, 1939   3 Sheets—Sheet 2

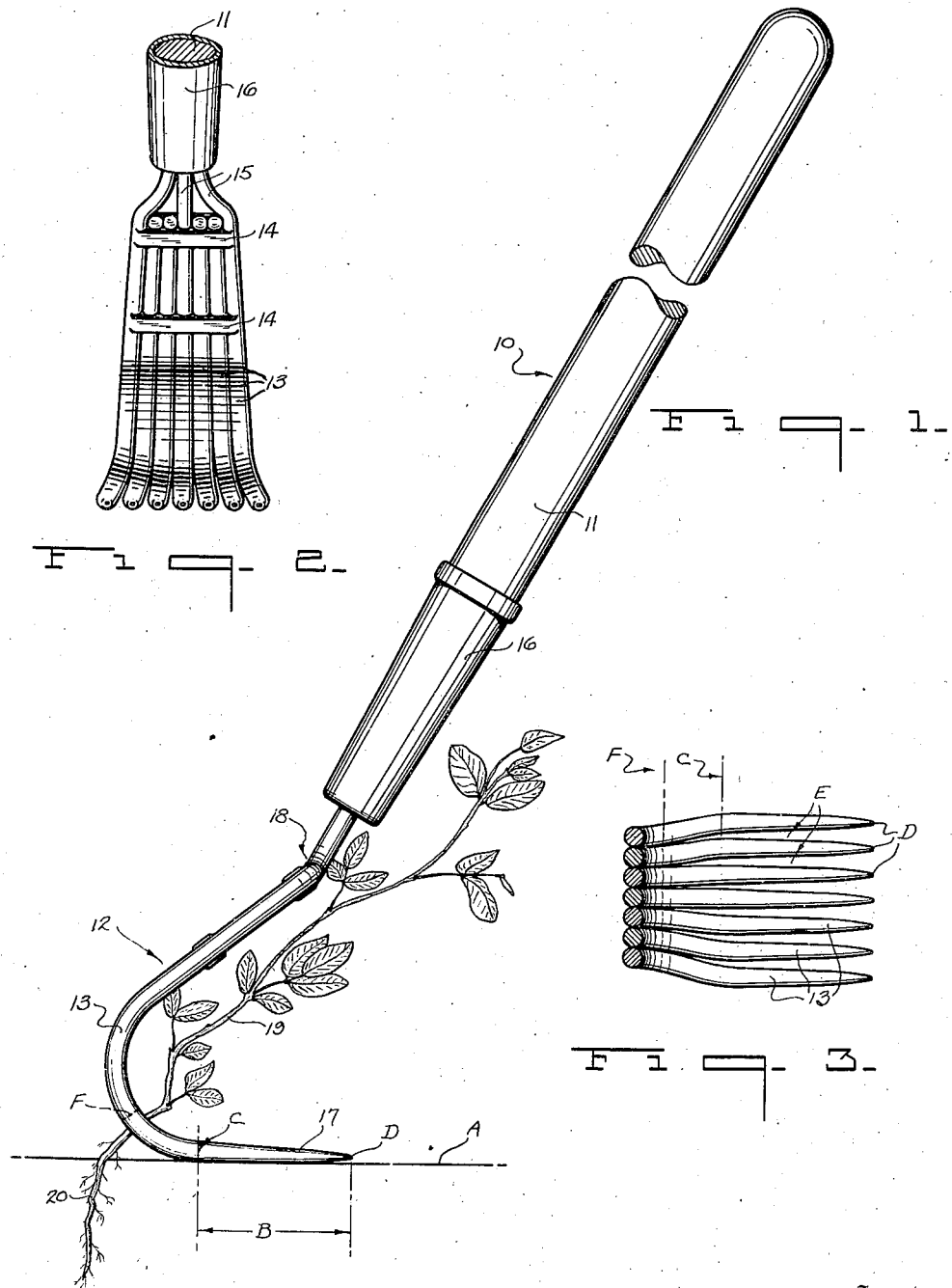

Inventor
HOWARD D. BRANDEBERRY.
By Frank Fraser
Attorney

April 14, 1942.  H. D. BRANDEBERRY  2,279,747
WEEDING TOOL
Filed Sept. 16, 1939   3 Sheets-Sheet 3
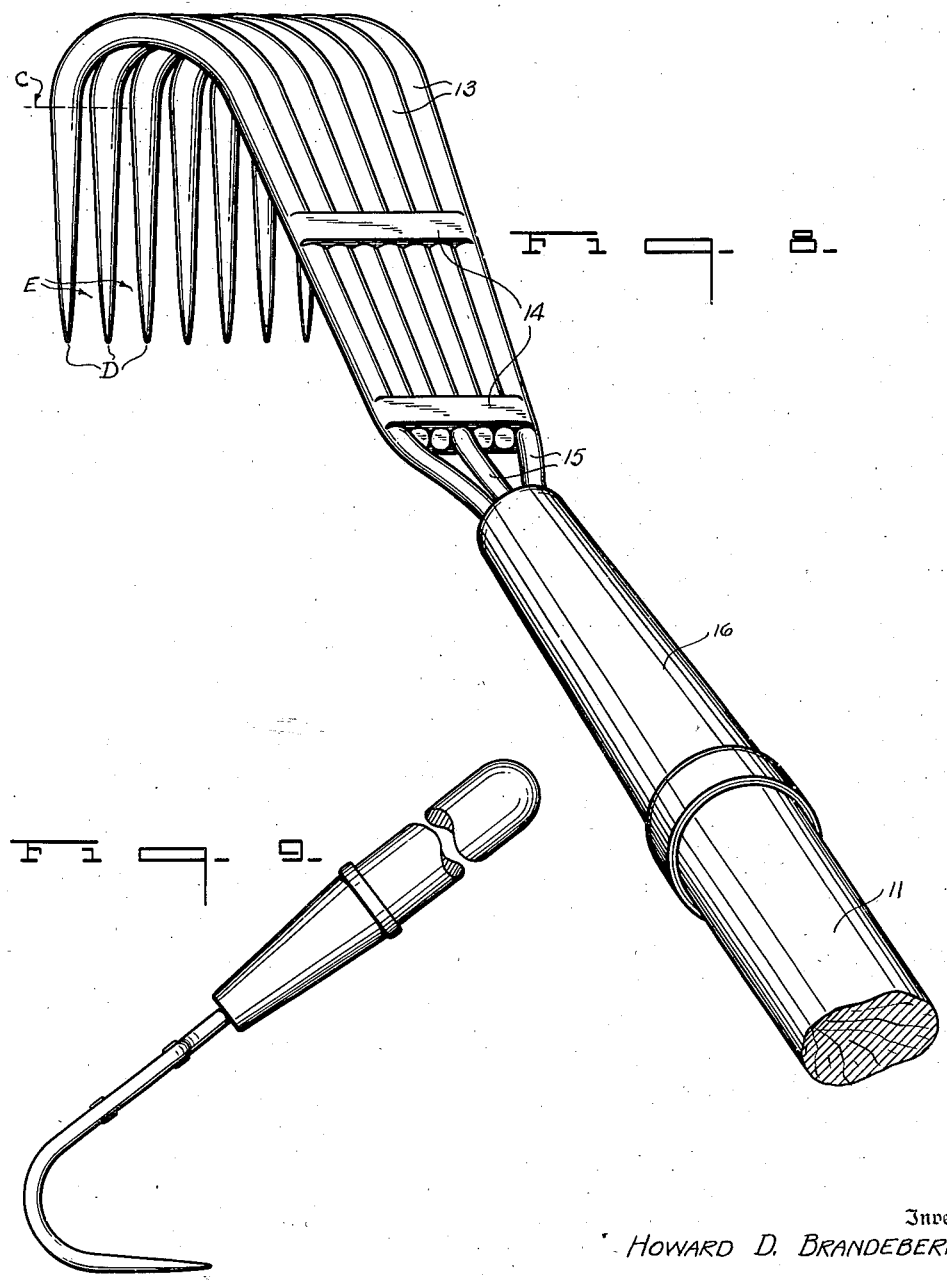
Inventor
HOWARD D. BRANDEBERRY,
By Frank Fraser
Attorney Patented Apr. 14, 1942

2,279,747

UNITED STATES PATENT OFFICE 2,279,747

WEEDING TOOL

Howard D. Brandeberry, Toledo, Ohio

Application September 16, 1939, Serial No. 295,175

9 Claims. (Cl. 97—63)

The present invention relates to an implement or tool for use in the removal of weeds and other objectionable plant growths from stands of grass such as lawns.

An important object of my invention is to provide a weeding tool satisfactory for effecting removal of miscellaneous types of lawn pests possessing different characteristics of growth structures without, however, removing or destroying the desirable grasses of which the lawn is composed.

Throughout this application, the expression "lawn" is used to include generically all cut stands or areas of substantially vertically growing grasses. Stated broadly, desirable lawn grasses, with the exception of creeping bent, grow in a substantially vertical direction, while a majority of the lawn pests, which I will refer to as weeds, grow or have portions extending in a generally horizontal direction.

My weeding tool is so designed that a plurality of suitably formed tines are arranged to create a series of prongs adapted to be slid along the ground and with the arrangement of the tines being such that tapering or elongated, substantially V-shaped spaces are created between adjacent tines. In most cases of weed removal, the tool is moved along the ground and the stem or other portions of the weed is caught by a wedge-like action in the apex of one or more of the V-shaped spaces between the tines. The spacing of the tines and V-shaped spaces therebetween are so controlled that the tool can be combed through a lawn without pulling or destroying desirable vertically growing grasses or the root structures thereof and yet effectively and completely remove a diversity of weeds and all or the essential parts of their root structures.

A further and important object of the invention is to provide such a tool whereby weeds can be removed from a lawn with relatively little effort and in such a way that the entire root structures of each weed or essential portions thereof are removed from the soil, thus preventing resprouting of the weed, such weed removal being accomplished without destruction to the lawn grasses or sod, thus minimizing the danger of producing objectionable bare spots or other defects in the contour of the lawn surface.

Other objects and advantages of the invention will become more apparent during the course of the following description when taken in connection with the accompanying drawings.

In the drawings wherein like numerals are employed to designate like parts throughout the same:

Fig. 1 is a side elevation illustrating use of one form of my weeding tool, and for sake of clarity in none of the weed illustrations have I included a showing of the lawn grasses;

Fig. 2 is a fragmentary elevation of the tool as the tool of Fig. 1 would appear when viewing it from the right hand side of the drawings;

Fig. 3 is a fragmentary plan view of a weeding tool provided with seven tines;

Fig. 8 is a perspective view of the tool; and

Fig. 9 is a side elevation of a slightly modified form of my weeding tool.

The problem of lawn weed control is a difficult one, and heretofore weed elimination or suppression has been attacked in some cases chemically, involving use of chemicals applied to or injected into the weed structure for the purpose of killing it. Naturally, dead weeds are unsightly and must be removed to give a satisfactory appearance to the lawn. It has also been common practice to use cutting tools for weed removal but this is not generally satisfactory because many weeds are not killed unless the entire root structure is removed, so that oftentimes cutting gives but temporary relief. Also, when cutting the weeds, there is the danger that some of the grasses will be accidentally cut and killed.

It is generally considered that the most effective way to rid a lawn of weeds is to actually pull the live weed including all the essential parts of its root structure from the soil.

In my opinion, proper pulling of weeds involves a number of factors:

First, the weed should be pulled in such complete fashion that no part thereof is left from which new growth may sprout.

Second, it is important that when the weed is removed, the desirable lawn grasses be not unduly disturbed; that is, the grass should not be pulled along with the weed nor should its root structure be destroyed or bruised to the extent that the grass itself will die.

Third, pulling of the weed should be accomplished in such a way that the root is withdrawn from the soil without tearing up the sod or spoiling the contour of the lawn surface from which the weed is taken.

Fourth, to be practical, the means for removing the weed must be such that an unreasonable length of time is not consumed in its accomplishment.

Fifth, to be practical, a single weeding tool should be capable of use for pulling a diversity of weed types, because ordinarily a lawn will be infested with more than one type of weed.

My weeding tool satisfactorily meets all of these requirements and has been actually and effectively used to clear weed growths from large areas of lawn. I have also noticed that the tendency for reappearance of weeds in a lawn combed with my tool has been noticeably reduced when compared to the tendency toward reappearance of weeds in other lawns weeded by prior practices.

Figure 7:
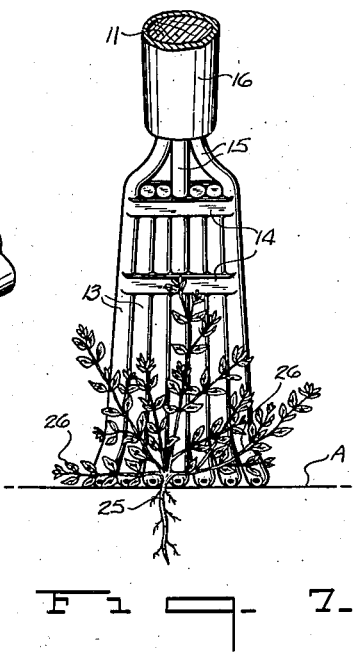
Fig. 7 is an elevation like Fig. 2 but illustrating removal of weeds of the general character of spotted spurge.

To simplify the explanation as to how the same weeding tool can be used for pulling many different types of weeds, I roughly classify some of the more common weeds as follows:

Group A—weed growths having low laterally extending branches such as illustrated in Fig. 7 of the drawings. This group will include spotted spurge (the weed illustrated in Fig. 7), trefoil, sheep sorrel, crab-grass, creeping buttercup, goose-grass, wire-grass, purslane, henbit, and others.

Group B—weeds which have a tendency to grow along the ground and from the branches of which roots sprout and take hold. This type of weed is represented by chickweed (illustrated in Fig. 5 of the drawings), ground ivy, veronica, heal-all, and others.

Group C—weeds having relatively thick or tapering stems (as illustrated in Fig. 1 of the drawings) including spurge, poison ivy, plantain, and others.

Group D, roughly speaking, includes weeds combining the charactertistics of the weeds of Groups A and C, and such weeds as peppergrass and spotted spurge may be mentioned.

Figure 6:
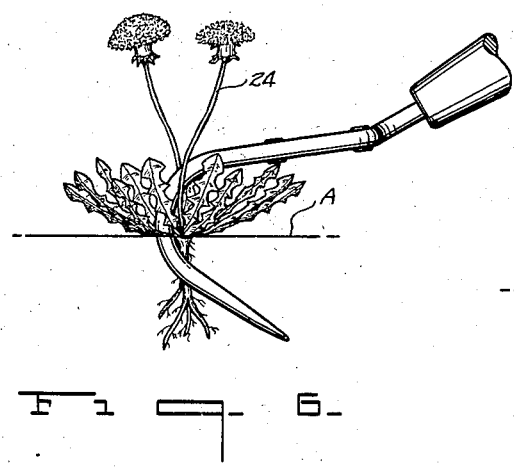
Fig. 6 is a side elevation showing how the tool may be employed to remove weeds such as dandelions.

As group E, the common dandelion is representative (Fig. 6). The leaves grow slightly below the turf level and it has a single heavy root something like a carrot.

By comparing the illustrations of weeds given in Figs. 1, 4, 5, 6 and 7, it will be seen that the weed growths commonly encountered in lawn care are quite dissimilar.

Referring now to the drawings more in detail, in Fig. 1 the weeding tool is designated in its entirety by the numeral 10 and the tool comprises a handle 11 and the working head 12. The working head 12 is composed of a plurality of tines 13 (see also Figs. 2 and 3). For hand manipulation of the tool, the number of tines is preferably not less than five nor in excess of fifteen, and about nine prongs has been found to be an excellent number for general all around use. The tines may be made from suitably tempered steel, and preferably from round stock approximately one-quarter inch in diameter. The tines are arranged in fan-like relationship, being welded or otherwise held together in assembled position as shown in Fig. 2. Tie pieces or brace members 14 may be used to give rigidity and strength to the construction and elements 15 are used to connect the tine assembly to the socket 16 which receives the handle 11. In Fig. 2 the connecting pieces 15 are illustrated as extensions of three of the tines, but obviously any other appropriate connection between the socket 16 and tine group can be used.

The tines have straight prongs or ends 17 and curved portions rising above the prongs as clearly illustrated in Fig. 1. When in assembled relationship as shown in the drawings, the straight prong portions of the tines are in the same plane, this plane being disposed transversely with respect to the longitudinal axis of the handle 11. For sake of easy manipulation, the angle of the prongs 17 should be approximately sixty degrees with respect to the longitudinal axis of said handle. That is, when the prongs 17 are placed upon the ground line A (in the various figures), the handle 10 will be disposed at approximately a sixty degree angle with respect thereto by reason of the gooseneck or curved portion 18. This angle can be varied but the one suggested has been found to be comfortable for the average operator when standing in a normally upright working position.

In Fig. 1 the prongs or forward ends of the tines are resting upon the ground A, and the length of the prong portions adapted to rest upon the ground when the tool is in a normal operating position such as that shown in Fig. 1 should range from about two and one-half inches to four inches. This is indicated in Fig. 1 as the dimension B. The curvature of the tines should be struck on a radius of from about one inch to two and one-half inches for satisfactory results.

As previously mentioned, the tines flare outwardly into fan-like formation which is quite clearly illustrated in Figs. 2 and 3, with the result that the outer ends D of the prongs are in spaced relation. This flaring of the prongs or tines, coupled with the fact that the tines are gradually and progressively reduced in diameter, from the point C in Figs. 1 and 3 toward the ends D, results in creation of the elongated tapering or V-shaped spaces E between adjacent tines.

An important feature is in the control of the distance between point C of the tines where they curve upwardly from the ground to the point F where adjacent tines come in contact with one another. This dimension, as has been determined by experimental work, should range from about three-quarters of an inch to one and one-half inches. It will be noted particularly in Figs. 2 and 3 that the tines are not only curved upwardly from the ground beginning at the point C, but are also pinched toward one another from the outside inwardly to the center so that the tapered space terminates in a pronounced wedge area or sharp apex. The wedge portion or apex of the tapered space is considered to be that portion of the space lying between the point C, representing the base of the apex proper, and the point F.

The spacing of the adjacent tines at the location C (base of the apex) is about one-eighth inch to one-half inch, and from this point C the tines are arranged in converging relationship so that adjacent tines contact one another within a distance of from three-quarters of an inch to about one and one-half inches. The angle of the wedge shaped space between the tines, especially from the point C to the point F, is important and critical. I have established that this angle should be within the range of five degrees to twenty degrees inclusive, with the lower end of the range, say five degrees to ten degrees, being most desirable for ordinary weeding use. If the angle is less than five degrees, some grass will be pulled; and if greater than twenty degrees, smaller weeds will be missed.

It will be noted in Fig. 1 that the points D of the ends of the tines are spaced very slightly above the ground level A which permits resting of the prongs upon the ground and sliding thereof over the ground without resulting in digging by the points D.

In Fig. 9 is shown a slight modification of the weeding tool. The tool 10 is designed for use where the operator stands in a normally upright working position to operate the tool. The modified form of Fig. 9 is intended more as a smaller hand tool where the user will be in a stooped or crouched position and, as shown, this tool does not include the gooseneck 18 embodied in Fig. 1. However, the specification as to arrangement of tines, tapered spaces between adjacent tines, wedged apexes, etc. should be followed in making this smaller implement.

In Fig. 1 is illustrated the pulling of spurge, one of the weeds falling in my classification C given above. This weed may be said to comprise the plant 19 having a root 20 which is relatively thick and of tapering formation. To remove this and similar types of weeds, the weeding tool is held approximately as shown so that the prongs are disposed in a horizontal position and adapted to ride along the ground when moved. The operator places the tool in advance of the weed and draws or drags the tool toward himself while holding the prongs in substantial parallelism to the ground contour. As the operator moves the head of the tool, the pointed ends of a pair of tines will straddle the stem and upon continued movement of the tool, the stem will be moved up into the apex or wedged space as is illustrated in Fig. 1. Naturally, the extent to which the stem will be forced up into the wedge portion will depend not only on the dimensions of the particular wedging tool being used but also upon the size of the weed. Upon continued movement of the tool toward the operator, the weed including its root will be removed from the soil. The operator can maintain the prongs in contact with the ground during the entire operation or he may lift the tool slightly if he wishes, but in either case the stem of the weed will have become sufficiently wedged between the tines to permit complete removal of the weed from the lawn.

Where a number of weeds are close together, the operator soon becomes accustomed to a rather fast combing of the grass and movement of the tool into suitable poistion to catch one or more of the weeds and to completely pull them out of the ground.

By constructing the weeding tool in the manner above described and keeping the various dimensions in the ranges given, it will be found that the tool does not dig into the ground but slides over the surface and through the grasses, allowing the desired vertically growing grasses to pass between the prongs without injury and at the same time the weed is picked up and removed. The weeds of course are heavier or thicker than grass, thus getting caught in the wedge of the V-shaped spaces and will not slip through from between the prongs while the grass does slip through. Furthermore, the wedging action is positive enough that the weed does not slip through the tool to merely strip its leaves and branches but grabs the stem near enough to the ground that the weed will not be broken or stripped. It will be pulled out intact.

I wish to emphasize that even though the weed, such as the spurge shown in Fig. 1, is located in a full growth of vertically growing grasses, and a relatively wide tool, say for example fifteen prongs, is combed through the grass, the grass itself will not be pulled but the weed will be pulled.

In some cases where particularly large hardy weeds are being removed, the operator may find it desirable to apply the tool to the weed a number of times from different approaches or to move the tool upwardly, or even resort to a rocking of the tool to loosen the weed root before pulling it from the soil, to obviate the possibility of breaking the weed stem off at ground level or displacement of the sod.

When following the range of dimensions and the design herein disclosed, shearing of the weed stem is avoided, and considerable pressure and pulling can be exerted on the weed without severing the weed from its root. As above stated, I consider it important to not only remove that portion of the weed appearing above the ground but also the entire root structure or at least the essential parts thereof to prevent resprouting of the root.

Figure 4:
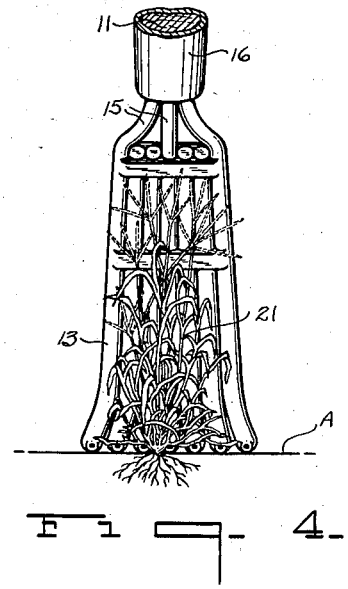
Fig. 4 is an elevation like Fig. 2 but illustrating removal of crab-grass and similar weeds.

In Fig. 4 a different type of weed is illustrated. Here the well known crab-grass 21 is shown which is a rather bushy weed having branches or blades low to the ground. The root structure is somewhat different from that of spurge just described, and in general crab-grass falls within the group "A" given above. With this type of weed, the action of the tool is such that the portion of the weed growing above the ground level is wedged between the tines in such a manner that the entire root structure is removed. In the case of the spurge, the stem itself is wedged between a single pair of tines but in the case of crab-grass, different portions of the weed are wedged in between a number of the tapered spaces or wedged portions produced by the arrangement of the tines.

To remove weeds such as crab-grass, the tool is combed through the lawn and even large areas of crab-grass can be pulled in one operation, and while the crab-grass has a bushy growth above the ground level and a relatively large spreading fibrous root structure, the weed is readily pulled from position without disturbing the vertically growing grass. Also, the action of the tool is such as to extract the weed without unduly loosening or disturbing the lawn sod so that the danger of creating undesirable bare spots is held to a minimum.

Figure 5:
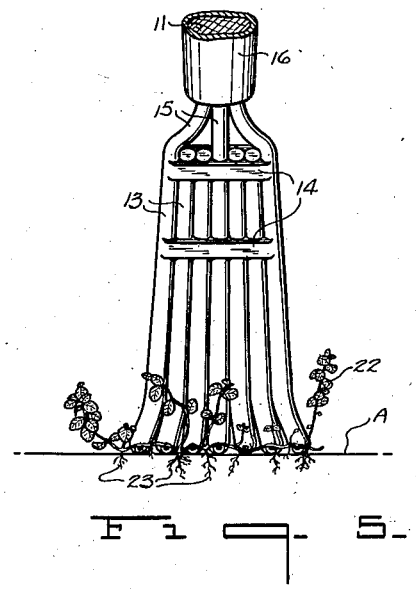
Fig. 5 is the same kind of view illustrating removal of chickweed and similar types of growths.

In Fig. 5 a type of weed included in the group B above is illustrated, this being chickweed 22. This type of weed grows along the ground, sending down roots 23 as shown in Fig. 5. When removing this type of weed, the weeding tool is combed through the lawn and the prongs slide between the stem and the ground and wedge the roots at a number of locations as shown, so that the entire weed, including the portions above the surface and the roots below the surface, is pulled without injury to the vertically growing grasses.

In Fig. 6 is illustrated removal of the dandelion 24. This use of the tool varies from the other uses just described because with most weeds the prongs or tines are slid along the surface of the ground without any digging action whatever. However, in the case of the dandelion, it is preferred that the prongs be pressed down under the surface of the ground so that the wedging action is brought into play upon the root portion of the weed located beneath the surface. This is illustrated quite clearly in Fig. 6 wherein the heavy tapering root is gripped at a distance below ground level and thus readily pulled from the ground. It is highly important that the root structure of dandelions be pulled out in this way to avoid resprouting. After the tool has been engaged with the root to bring into play the wedging action, the tool is twisted slightly to either side for the purpose of loosening the dandelion and then, to avoid unnecessary tearing of the sod, the tool may be removed and slid along the ground between the leaves of the weed and the ground to complete removal of the plant. Thus, the digging and twisting serves as a preliminary step for loosening the plant while final withdrawal of the weed from the ground is accomplished after the tool has been placed in sliding contact with the sod to pull the previously loosened plant.

In Fig. 7 is illustrated still another type of weed, namely, spotted spurge, which is representative of the group D. In this case the prongs are moved under the low, horizontally growing branches and wedging of the main root is effected. The root 25 is shown as being wedged between a pair of adjacent tines, while the low hanging branches 26 ride over the upper surface of the tines, and upon continued movement of the tool, this class of weed is quite readily pulled.

Although my weeding tool has been designed primarily for use in removing weeds from lawns, it is obvious that it can also be used for removing weeds from gardens, flower beds, and such places, and as a cultivating tool.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. A weeding tool of the character described, comprising a handle, a plurality of tines arranged side by side, adjacent tines contacting at one end thereof and disposed in flared spaced relationship at the opposite ends thereof, said group of tines being associated with the handle at the contacting ends, the tines being curved between their ends and creating substantially elongated V-shaped spaces therebetween terminating in the curved portions thereof, the inner ends of said spaces being wedge shaped, the wedge shaped portions of the spaces being of a length falling within the range of three-quarters of an inch to one and one-half inches, the angles of said wedge shaped spaces falling within the range of from five degrees to twenty degrees.

2. A weeding tool of the character described, comprising a handle, a plurality of tines arranged side by side, adjacent tines contacting at one end thereof and disposed in flared spaced relationship at the opposite ends thereof, said group of tines being associated with the handle at the contacting ends, the tines being curved between their ends and creating substantially elongated V-shaped spaces therebetween terminating in the curved portions thereof, the inner ends of said spaces being wedge shaped, the wedge shaped portions of the spaces being of a length falling within the range of three-quarters of an inch to one and one-half inches and the space between adjacent tines at the base of said wedge shaped space falling within the range of one-eighth inch to one-half inch, the angles of said wedge shaped spaces falling within the range of from five degrees to twenty degrees.

3. A weeding tool of the character described, comprising a handle, a plurality of tines associated therewith, the ends of the tines remote from the handle being spaced from one another and being disposed in a plane which is transverse with respect to the longitudinal axis of the handle, adjacent tines being brought together at a distance from their spaced ends to create elongated spaces therebetween, each of said spaces terminating at its inner end in a tapered, sharp apex within which portions of weeds may be wedged without cutting thereof, and all of said sharp apexes being substantially on a straight line transverse with respect to the longitudinal axis of said handle.

4. A weeding tool of the character described, comprising a handle, a plurality of tines associated therewith, said tines having inner curved portions and terminating in straight spaced prongs extending in a generally horizontal plane when the tool is in a normal working position, said prong ends being disposed in a plane which is transverse with respect to the longitudinal axis of the handle, adjacent tines being brought together into contact with one another in the curved portions thereof in a plane higher than the horizontally extending prongs and creating elongated spaces therebetween, each of said spaces terminating in the curved portions above the prong level in a tapered, sharp apex within which portions of weeds may be wedged without cutting thereof.

5. A weeding tool of the character described, comprising a handle, a plurality of tines associated therewith, the ends of said tines remote from the handle being spaced from one another and being disposed in a plane which is transverse with respect to the longitudinal axis of the handle, adjacent tines being brought together at a distance from their spaced ends in a manner to create substantially elongated V-shaped spaces therebetween, the angle of said V-shaped spaces at their apexes falling within the range of from five degrees to twenty degrees.

6. A weeding tool of the character described, comprising a handle, a plurality of tines associated therewith, said tines having straight prong ends extending in a generally horizontal plane when the tool is held in its normal working position, each of said tines having a curved portion rising above the prong and being curved on a radius of from one inch to two and one-half inches, the straight prong ends of said tines being disposed in a plane which is transverse with respect to the longitudinal axis of the handle, adjacent tines being brought together at a distance from their spaced ends in a manner to create substantially elongated V-shaped spaces therebetween, the angle of said V-shaped spaces at their apexes being sharp and falling within the range of from five degrees to twenty degrees.

7. A weeding tool of the character described, comprising a handle, a plurality of tines associated therewith, each of said tines having straight prong ends and curved portions rising above the same, the pronged ends of adjacent tines being spaced from one another and all extending in a generally horizontal plane when the tool is held in its normal working position, adjacent tines being brought together into contact with one another in the curved portions thereof in a manner to create substantially elongated V-shaped spaces between the tines, which spaces terminate in sharp apexes in the curved portions thereof, the angle of said apexes falling within the range of from five degrees to twenty degrees.

8. A weeding tool of the character described, comprising a handle, a plurality of tines associated therewith, the ends of the tines remote from the handle being straight prongs spaced from one another and being disposed in a plane which is transverse with respect to the longitudinal axis of the handle, said tines having curved portions rising above said ends and being curved on a radius of from one inch to two and one-half inches, the length of the prong portions of said tines being approximately from two and one-half inches to four inches, adjacent tines being brought together into contact with one another in the curved portions thereof and creating substantially elongated V-shaped spaces therebetween, said V-shaped spaces terminating in sharp, wedge-shaped spaces the length of which falls within the range of from three-fourths inch to one and one-half inches, and the angle of their apexes falling within the range of from five degrees to twenty degrees.

9. A weeding tool of the character described, comprising a handle, a plurality of tines associated therewith, the ends of the tines remote from the handle being straight prongs spaced from one another and being disposed in a plane which is transverse with respect to the longitudinal axis of the handle, said tines having curved portions rising above said ends and being curved on a radius of from one inch to two and one-half inches, the length of the prong portions of said tines being approximately from two and one-half inches to four inches, adjacent tines being brought together into contact with one another in the curved portions thereof and creating substantially elongated V-shaped spaces therebetween, said V-shaped spaces terminating in sharp, wedge-shaped spaces the length of which falls within the range of from three-fourths inch to one and one-half inches, and the angle of their apexes falling within the range of from five degrees to twenty degrees, the space between adjacent tines at the base of the wedge-shaped space being not less than one-eighth inch and not more than one-half inch.

HOWARD D. BRANDEBERRY.